Sept. 24, 1946.  G. A. MOORE  2,408,267
SETSCREW
Filed Aug. 17, 1944
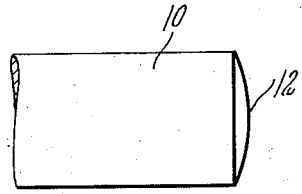
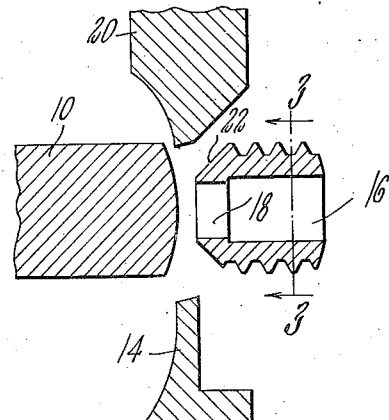
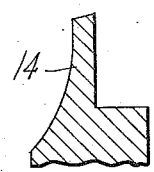
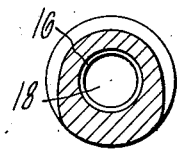
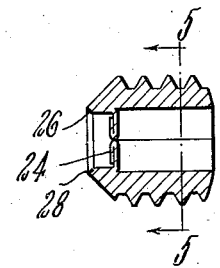
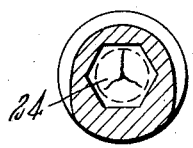
Inventor
George A. Moore
by Wright, Brown, Quinby & May
Attys.

Patented Sept. 24, 1946

2,408,267

UNITED STATES PATENT OFFICE 2,408,267

SETSCREW

George A. Moore, Medford, Mass.; George A. Moore, Jr., Harrington Moore, and Lawrence Moore, executors of said George A. Moore, deceased Application August 17, 1944, Serial No. 549,849

2 Claims. (Cl. 85—1)

This invention relates to an improved socket set-screw and a method of making the same. More particularly, the invention relates to improvements in a headless, cup-pointed set-screw having a hexagonal bore or socket in one end to receive a wrench which consists of a rod having a hexagonal cross-section of nearly the same size. Set-screws of this kind are used in large numbers in industry, especially in the smaller sizes. The invention will be described as embodied in a small screw having an extreme diameter of 1/4 inch and a length of 1/4 inch. Screws of this size, having a thread pitch of 20 turns to the inch, are standard for many uses. It will be understood, however, that the invention is not to be limited to a screw of any particular size or dimension.

It is an object of the invention to provide an improved set-screw of the kind referred to and to provide a method of making such screws more cheaply and more uniformly so that the percentage of "rejects" or imperfect screws is reduced.

Set-screws of this kind are customarily made from rod stock. Many of the forming operations are performed by automatic machinery before the partly finished screw is cut off from the stock. Ordinarily, when the partly finished screw is being cut off, it breaks away from the stock shortly before the cut-off tool completes its cut. This results in a small central projection or "teat" being left on the end of the screw, which teat must be removed before that end can be properly countersunk to form the cup point since its presence would interfere with the centering of the countersink. It is important that the cup point be accurately concentric with the axis of the screw.

According to the present invention, a bore is drilled axially in the stock to extend the full length of the screw. The cut-off tool intersects this bore so that when the screw is severed from the stock there is no teat thereon to be removed. Thus one of the steps of the usual method of making screws of this type is eliminated.

Prior to severing the screw from the stock several operations are performed, such operations comprising cutting a screw thread on the lateral surface, countersinking the end of the stock to center the drill which is used to drill an axial bore in the stock, and cutting a chamfer on what is to be the cup end of the screw. The screw is then cut off from the stock and the remaining operations are performed as hereinafter described.

For a more complete understanding of the invention, reference may be had to the following description thereof and to the drawing, of which;

Figure 1 is a side elevation of a portion of a piece of rod stock ready for the fabrication of a set-screw therefrom.

Figure 2 is a sectional view of the same and a partly finished screw severed therefrom, two of the tools employed being indicated.

Figure 3 is a section on the line 3—3 of Figure 2.

Figure 4 is a finished screw shown in longitudinal section.

Figure 5 is a section on the line 5—5 of Figure 4.

In Figure 1 is illustrated an end portion of rod stock 10 such as is customarily used in making headless set-screws. As shown, the leading end of the stock has been slightly rounded off as at 12 by the cut-off tool 14 which cut off from the rod the preceding screw made therefrom, as hereinafter described. For screws of the particular size referred to by way of illustration, stock having a diameter of 1/4 inch is employed. The stock is fed into an automatic screw-making machine (not shown) of a kind well known in the art. By the time the screw is ready to be cut off from the stock, it has been threaded and drilled, and the end at the cut-off has been chamfered. The drilling is done in two steps to form a bore 16 which has a diameter of 1/8 inch and extends inward axially to a depth of about 1/5 inch, that is, about 4/5 of the length of the finished screw, and an inner axial extension 18 which has a diameter of about 1/16 inch and is of sufficient length to give the bore a total depth of slightly over 1/4 inch. A suitable tool 29 is used to cut a chamfered surface 22 adjacent to the cut-off. When the screw is cut off from the stock, the cut-off tool intersects the inner bore 18 so that no "teat" can be formed on the cut-off end of the screw. The tool is shaped to round off the fresh end of the stock in the cut-off operation.

After the screw is severed from the stock, the larger portion 16 of the bore is broached to a hexagon shape as indicated in Figure 5, the diameter between opposite faces being 1/8 inch so that a wrench of corresponding cross-section will be received with a snug fit. The chips resulting from the broaching operation are pushed ahead of the broaching tool and crowd together as at 24 in the smaller portion 18 of the bore, thus plugging the bore, the compacted chips having an appearance somewhat as indicated in Figure 5 when viewed through the broached portion of the bore. The end of the bore 18 is then slightly countersunk, as at 26, to provide the cup point with a sharp but more rugged edge 28 which is circular, the circle thereof having a diameter of ⅛ inch which is the customary diameter of cup points in screws of this size.

The inner bore 18 not only avoids the formation of a teat in the cut-off operation, but it also provides a space to receive the broach chips. The latter provision results in two advantages. First, excessive pressures are avoided in the screw when the broaching tool reaches the end of its stroke. Furthermore the broaching extends for approximately four-fifths of the total length of the screw which is substantially more than has heretofore been possible in screws of the size described, except where the broaching has extended through the entire length of the screw. This feature is important in short screws since in such screws of usual design, only an inadequate length of wrench can be received.

It is to be understood that the foregoing mention of specific dimensions is for purposes of illustration only and not by way of limitation.

I claim:

1. A headless, cup-pointed set-screw having a bore extending therethrough from end to end, said bore having a relatively short cylindrical portion extending in from the cup-pointed end of the screw and a relatively long portion of larger diameter and of polygonal shape extending in from the opposite end of the screw.

2. A headless, cup-pointed set-screw having a length approximately equal to its external diameter and having a bore extending therethrough from end to end, said bore having a relatively short cylindrical portion extending in from the cup-pointed end and a relatively long hexagonal portion of greater diameter extending in from the other end, and a plug of broaching chips compacted in said shorter portion of the bore.

GEORGE A. MOORE.